3,140,148
METHOD OF TREATING EXHAUST GASES WITH
URANIA-CONTAINING CATALYSTS
Lawrence J. E. Hofer, Bridgeville, and Robert B. Anderson, Pittsburgh, Pa., assignors to the United States of America as represented by the Secretary of the Interior
No Drawing. Filed July 26, 1961, Ser. No. 127,066
14 Claims. (Cl. 23—2)
(Granted under Title 35, U.S. Code (1952), sec. 266)

The invention herein described and claimed may be manufactured and used by or for the Government of the United States of America for governmental purposes without the payment of royalties thereon or therefor.

This invention relates to a catalytic oxidation process and more particularly, to a method for oxidation of internal combustion engine exhaust gas and similar fumes.

Internal combustion exhaust gas, particularly the exhaust gas from automobiles, is believed to be an important contribution to air pollution. An automobile engine under normal conditions of operation exhausts to the atmosphere, in addition to carbon dioxide and water, a variety of products of incomplete combustion. Among these are oxygenated compounds, such as ketones, aldehydes, peroxides, esters, organic acids, and carbon monoxide, as well as hydrocarbons. In the presence of atmospheric oxygen and radiant energy from the sun, the organic constituents of the exhaust gas combine with oxides of nitrogen to produce the eye-irritating smog. In certain geographical localities, where meteorological conditions are favorable, the number of automobiles is large and the sunshine intense, smog formation has been a problem of great concern.

There have been numerous proposals to reduce the output of hydrocarbons and partially oxidized compounds from automobile engines by catalytic oxidation. In general, these employ a catalyst which can be placed either within the muffler or in the exhaust manifold of the engine. A small amount of auxiliary air is introduced into the exhaust stream, and catalytic oxidation to carbon dioxide and water takes place.

However, none of these proposals have been generally adopted for one reason or another. In some the catalyst employed became rapidly deactivated, or was not physically able to withstand the rough treatment encountered in actual road use. It has been proposed for example, to use a vanadia-alumina type catalyst as an exhaust gas purifier. While successful, it was found that deactivating vanadium-lead compounds were formed during operation at temperatures required to oxidize CO, the lead being supplied by the tetraethyl lead content of the gasoline.

In order to be effective for the purpose of oxidizing exhaust gas, a catalyst must be resistant to poisoning caused by the oxidation of tetraethyl lead, sulfur in the fuel, organic halide scavengers, and phosphate and borate deposit modifiers. These react to form lead halides, oxides, sulfates, phosphates and borates. The catalyst must be physically strong to withstand road use, and the catalytic material employed must be in relatively plentiful supply, since the number of individual catalytic units required would be very large. We have found that a catalyst comprising urania on an inert carrier meets these criteria. Promoters may be added to enhance its activity.

At the present time a considerable quantity of depleted uranium, from which most of the fissionable U-235 has been removed, is available in relatively large quantities. We have found that a catalyst comprising urania deposited on a suitable inert carrier is a very effective catalyst for purifying exhaust gas. The urania does not combine with any of the lead present, and is not appreciably affected by sulfur and other poisons. The depleted uranium catalyst has only a slight amount of radioactivity which in use presents no radiological health hazard, nor is there any radioactive contamination of the area.

The principal object of this invention is to provide a simple, effective and economical method for the oxidation of hydrocarbons and partially oxygenated compounds in exhaust gas and fumes at a reasonable temperature to produce harmless products.

A further object of this invention is to provide a catalytic method for oxidizing exhaust gases from internal combustion engines and other exhaust fumes to harmless products, employing a urania catalyst.

A further object of this invention is to provide a catalytic method for oxidizing exhaust gases from internal combustion engines, and other exhaust fumes, employing a catalyst comprising urania on an inert carrier.

Yet a further object of this invention is to provide a catalyst for oxidizing exhaust gases from internal combustion engines comprising urania on an alumina, silicon carbide, titania, or other inert carrier, having chromia and copper oxide as activators.

A further object of this invention is to provide a catalytic method for oxidizing exhaust gas by admixing secondary air therewith and passing the mixture over a urania catalyst.

Further objects will become apparent from the rest of the specification.

THE CATALYST

Example 1

A 5% urania catalyst was prepared as follows: 113.5 grams of uranyl nitrate, $UO_2(NO_3)_2 \cdot 6H_2O$ were dissolved in about 55 ccs. of distilled water to make a concentrated solution. This solution was then added to 1220 grams of Alcoa alumina, designated H-151, in the form of ⅛ inch spheres and having a surface area of about 400 meters$^2$/gm. The mixture was evaporated to dryness on a steam bath. After drying, the impregnated alumina spheres were heated for 4 hours in air at 700° C. in a muffle furnace to decompose the uranium salt. The decomposition temperature employed should be high enough to effect the decomposition and should be at least 300° C.

Other uranium compounds which are water soluble may be substituted for uranyl nitrate. The amount of water employed should ideally be no more than enough to wet the alumina supporting pellets. Suitable uranium salts that may be employed are uranyl acetate, uranyl ammonium carbonate, uranyl chloride, etc. In the case of uranyl chloride, heating or calcination in the presence of water or ammonia results in hydrolysis, and HCl or $NH_4Cl$ is driven off leaving $U_3O_8$ behind.

High surface area is important for catalytic activity. The spherical shape is advantageous since this form is most resistant to abrasion during use. In the turbulent flow of exhaust gases through a catalyst bed, abrasion is very likely to occur, causing loss of catalyst material, and the packing of catalyst material into a difficultly penetrable mass.

The main requirements for the support are that it be substantially inert, have a large surface area, and be reasonably accessible through its pores to the reacting gases, and that it be resistant to abrasion. Besides alumina, porous supports having large surface areas which may be used, include silicon carbide, silica, titania, porcelain, and silica-alumina cracking catalysts.

Instead of impregnating a porous carrier with a uranium salt as described, the catalyst may be formed by adsorbing gaseous uranium hexafluoride on the carrier and then hydrolyzing in situ, followed by heating.

The urania content of the catalyst may vary considerably. We have found that a urania content of 2 to 6 percent is generally satisfactory. However, lower or higher concentrations may be employed, ranging from 0.5 to 15 percent.

*Example 2*

Promoted catalysts were prepared by impregnating urania-alumina catalyst of Example 1 with the nitrate of a promoter metal and igniting the decompose the nitrate.

(a) 18.0 grams of chromium nitrate, $Cr(NO_3)_3 \cdot 9H_2O$, was dissolved in 75 ccs. of water and was added to 165.4 grams of urania-alumina catalyst prepared as in Example 1, having a U content of 3.4%. The mixture was evaporated to dryness and ignited. The composition of the catalyst was 3.9% $U_3O_8$, 2.0% $Cr_2O_3$, 94.1% $Al_2O_3$.

(b) 18.0 grams of ferric nitrate, $Fe(NO_3)_3 \cdot 9H_2O$, was substituted for chromium nitrate in (a) to yield a catalyst of the composition 3.9% $U_3O^8$, 2.1% $Fe_2O_3$, 94.0% $Al_2O_3$.

(c) 9.0 grams of cupric nitrate, $Cu(NO_3)_2 \cdot 3H_2O$, was substituted for chromium nitrate in (a) to yield a catalyst having 3.9% $U_3O_8$, 1.8% CuO, 94.3% $Al_2O_3$.

(d) A urania catalyst having a mixed promoter was prepared as follows:

13.5 grams uranyl nitrate ($UO_2(NO_3)_2 \cdot 6H_2O$), containing 85.7% of the uranium indicated by the formula (the rest being additional moisture); 4.3 grams chromium trioxide ($CrO_3$) and 7.4 grams copper nitrate $$(Cu(NO_3)_2 \cdot 3H_2O)$$

were dissolved in 75 ccs. of distilled water at room temperature. The resulting solution was added to 157.9 grams of H-151 Alcoa alumina, ⅛ inch spheres (containing about 5% water) and stirred constantly for 30 minutes. The resultant slurry was then heated on a steam bath with constant stirring until apparently dry, and then heated in an oven at 105–110° C. overnight. After removal from the oven the dried material was heated in an electric air-muffle furnace at 700° C. for four hours, then removed and allowed to cool, and then packaged. The resulting catalyst contained 4% $U_3O_8$, 1.4% $Cr_2O_3$, 1.5% CuO and 93.1% $Al_2O_3$.

The promoter employed may vary in amount from 0.5% to an amount which, together with the urania, amounts to about 15% of the catalyst.

Addition of various other metals did not prove beneficial. For example, manganese and cobalt neither added to nor detracted from the activity of the urania-alumina catalyst.

CATALYTIC OXIDATION

Catalysts prepared as above were evaluated by observing the results obtained with them in the oxidation of isopentane and carbon monoxide. Hydrocarbons and carbon monoxide are both typically present in exhaust gas. Isopentane and carbon monoxide was selected principally because the hydrocarbon is one of the more difficult components to oxidize catalytically, and control of carbon monoxide is required by the State of California in its legal standards for motor vehicle exhaust emissions. This latter requires that in a motor vehicle exhaust gas, the hydrocarbon content shall be no more than 275 parts per million, or .165 mole percent carbon atoms, and the carbon monoxide present shall be no more than 1.5% by volume.

The catalysts were tested with a gaseous mixture containing 0.2% isopentane, 2% CO, 4% $O_2$ and the remainder $N_2$ at an hourly space velocity of 10,000 (volumes of gas mixture under standard conditions per volume of catalyst space per hour) in a small cylindrical reactor. This gas flow is typical of velocities encountered in a catalytic automobile engine muffler.

The reactor consisted of a ½ inch stainless steel tube positioned in an electric furnace, so that any desired temperature between 200° C. and 700° C. could be maintained. A uniform charge of 12.5 cc. of catalyst was employed in all tests. Gases leaving the reactor were analyzed for $CO_2$, CO, $O_2$ and unreacted isopentane.

Table 1 gives the temperatures found necessary to oxidize 60 and 80 percent of the isopentane, and 40 and 60 percent of the carbon monoxide.

TABLE 1

| Catalyst | Temperature, C., required to oxidize | | | |
| --- | --- | --- | --- | --- |
| | Isopentane | | Carbon Monoxide | |
| | | | | |
| (On $Al_2O_3$ carrier) | 60% | 80% | 40% | 60% |
| 4% $U_3O_8$ | 655 | 700 | 620 | 700 |
| 4% $U_3O_8$, 1.5% $Fe_2O_3$ | 505 | 570 | 530 | 600 |
| 4% $U_3O_8$, 1.5% $Cr_2O_3$ | 395 | 450 | 429 | 565 |
| 4% $U_3O_8$, 1.5% CuO | 535 | 635 | 385 | 445 |
| 4% $U_3O_8$, 1.4% $Cr_2O_3$+1.5% CuO | 480 | 575 | 370 | 440 |

These results indicate that a urania-alumina catalyst is effective in oxidizing a substantial amount of the isopentane and carbon monoxide present in the test gas. The promoters are effective in lowering the oxidation temperatures required.

From this table it can be seen that as compared to the unpromoted catalyst chromium promoter produced a marked improvement in combustion of isopentane and a moderate improvement for CO. Copper promoter produced a marked improvement in combustion of CO and moderate improvement for isopentane. Iron promoter produced a moderate increase in combustion of both isopentane and carbon monoxide. A catalyst promoted with both chromium and copper was effective in improving combustion of both isopentane and carbon monoxide.

ENGINE TEST

A converter was mounted in the exhaust manifold of a 1957 Ford V8 automobile engine coupled to a dynamometer, and operated to simulate actual road conditions. Data were obtained, using standard commercial gasoline having 3 cc. tetraethyl lead per gallon, at the equivalent of 40 m.p.h. cruise; 60 m.p.h. cruise; 40 m.p.h. cruise-climb; and idle. 21 pounds of 4% $U_3O_8$ on $Al_2O_3$ catalyst was employed, and disposed in the muffler in a layer at an angle to the direction of gas flow. Secondary or auxiliary air was introduced in an amount at least sufficient to completely oxidize the oxidizable components of the exhaust gas.

The results are summarized in the following Table 2.

TABLE 2.—CONVERSION OF HYDROCARBONS IN ENGINE EXHAUST BY URANIUM BASE CATALYST

| Engine Mode | Temperatures, °F. | | Concentration, p.p.m. carbon [1] | | Percent Conversion | Hydrocarbon Emission,[2] Percent Calif. Allowable |
|---|---|---|---|---|---|---|
| | Exhaust Inlet | Center of Catalyst Bed | Before Converter | After Converter | | |
| 1. 40 m.p.h. Cruise | 680 | 710 | 1,100 | 900 | 18 | 37 |
| 2. 60 m.p.h. Cruise | 750 | 950 | 300 | 250 | 17 | 10 |
| | 750 | 950 | 500 | 400 | 20 | 16 |
| 3. 40 m.p.h. Cruise-climb [3] | 900 | 990 | 708 | 196 | 72 | 8 |
| | 840 | 990 | 272 | 163 | 40 | 7 |
| 4. Idle (following cruise-climb) | 950 | 1,040 | 4,653 | 1,380 | 70 | 56 |
| | 950 | 985 | 4,174 | 1,493 | 64 | 61 |

[1] Equivalent to (mols of hydrocarbon per $10^6$ mols of exhaust) times (the average number of carbon atoms per molecule).
[2] Uncorrected for addition of auxiliary air to converter.
[3] Engine torque=1.5 times cruise torque.

Although no analysis was made for CO reduction principally because the engine was adjusted to produce minimum CO, it is apparent from Table 1 that the CO content in exhaust gas would be lowered, and that the addition of activators would enhance the oxidation of CO.

While the method has been described with particular reference to gasoline engines, it is obvious that it is equally applicable to other internal combustion engines. It may also be employed in after burners, wherever unconsumed or partially oxidized hydrocarbons are discharged into the atmosphere, to render such fumes harmless. The use of the above described method may be used in treating the gaseous effluent of oil refineries, dry cleaning plants, painting establishments, and plants wherein solvent extraction processes employing hydrocarbon or other combustible solvents are used.

Many forms of apparatus have been devised supporting catalytic material within the exhaust system of an internal combustion engine. Typical of these are the devices shown in the Houdry patents—2,674,521, 2,664,340, and 2,766,875. The urania catalyst described herein may be employed in these or analogous devices in an automotive or other exhaust system, in a manner apparent to those skilled in the art.

We claim:

1. A method for oxidizing combustible constituents of exhaust gas and fumes containing hydrocarbons, partially oxidized hydrocarbons, carbon monoxide, and the like, which comprises passing hot exhaust gas together with added oxygen over a catalyst consisting of an inert porous carrier mass having dispersed thereon a member of the group consisting of (a) urania, and (b) urania plus a promoter selected from the group consisting of ferric oxide, chromic oxide, copper oxide, and mixtures thereof.

2. A method for oxidizing internal combustion engine exhaust gas which comprises passing hot exhaust gas together with added oxygen over a catalyst consisting of an inert porous carrier mass having dispersed thereon a member of the group consisting of (a) urania, and (b) urania plus a promoter selected from the group consisting of ferric oxide, chromic oxide, copper oxide, and mixtures thereof.

3. A method for oxidizing internal combustion engine exhaust gas which comprises passing hot exhaust gas together with added oxygen over a catalyst consisting of an inert porous carrier mass having dispersed thereon urania.

4. A method for oxidizing internal combustion engine exhaust gas which comprises passing hot exhaust gas together with added oxygen over a catalyst consisting of an inert porous carrier mass having dispersed thereon urania plus ferric oxide as a promoter.

5. A method for oxidizing internal combustion engine exhaust gas which comprises passing hot exhaust gas together with added oxygen over a catalyst consisting of an inert porous carrier mass having dispersed thereon urania plus chromic oxide as a promoter.

6. A method for oxidizing internal combustion engine exhaust gas which comprises passing hot exhaust gas together with added oxygen over a catalyst consisting of an inert porous carrier mass having dispersed thereon urania plus cupric oxide.

7. A method for oxidizing internal combustion engine exhaust gas which comprises passing hot exhaust gas together with added oxygen over a catalyst consisting of an inert porous carrier mass having dispersed thereon urania plus cupric oxide and chromic oxide.

8. The method of claim 1, wherein the carrier is alumina.

9. The method of claim 2, wherein the carrier is alumina.

10. The method of claim 3, wherein the carrier is alumina.

11. The method of claim 4, wherein the carrier is alumina.

12. The method of claim 5, wherein the carrier is alumina.

13. The method of claim 6, wherein the carrier is alumina.

14. The method of claim 7, wherein the carrier is alumina.

References Cited in the file of this patent

UNITED STATES PATENTS

| 1,844,998 | Wietzel | Feb. 16, 1932 |
| 1,930,716 | Jaeger | Oct. 17, 1933 |
| 2,932,620 | Von Fuener et al. | Apr. 12, 1960 |
| 2,942,932 | Elliott | June 28, 1960 |

OTHER REFERENCES

Nelson et al.: "Potential Non-Nuclear Uses for Depleted Uranium," T.I.D. 8203, Jan. 29, 1960, pages 23–26.